Oct. 16, 1956 S. ROHE 2,766,992
TOBOGGAN STEERING RUNNERS
Filed June 16, 1954
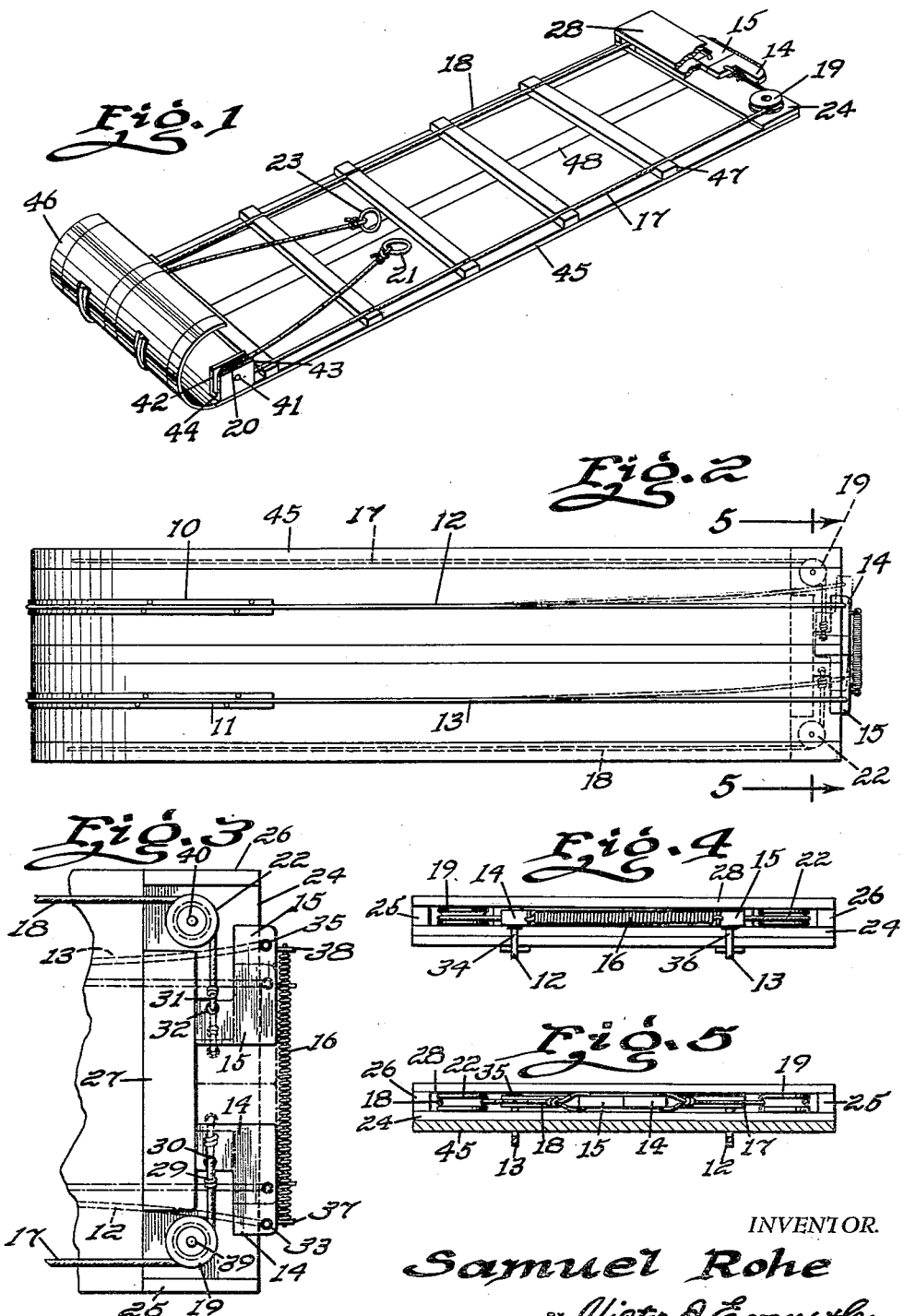
INVENTOR.
Samuel Rohe
BY Victor J. Evans & Co.
ATTORNEYS

United States Patent Office 2,766,992
Patented Oct. 16, 1956

2,766,992

TOBOGGAN STEERING RUNNERS

Samuel Rohe, Hebbronville, Tex.

Application June 16, 1954, Serial No. 437,064

4 Claims. (Cl. 280—22)

This invention relates to steering devices for toboggans, and in particular to a pair of semi-flexible guide rods positioned on the under surface of a toboggan. The forward ends of the rods are rigidly held at the forward end of the toboggan with the ends of the rods at the trailing end of the toboggan secured to laterally slidable blocks. The blocks are connected by a spring and are adapted to be moved laterally with cords trained over pulleys and extended rearwardly from the forward end of the toboggan whereby the toboggan may be turned to the right or left or, by spreading the guide rods the progress of the toboggan may be retarded or completely stopped.

The purpose of this invention is to provide means whereby a person positioned on a toboggan may positively guide, slow down or stop the toboggan.

Various types of steering devices have been provided for toboggans, particularly where one side is elevated; however, owing to the speed of a toboggan it is difficult to influence a toboggan from the line of travel. With this thought in mind, this invention contemplates guide rods in the form of runners positioned on the under or sliding surface of a toboggan and means whereby a person positioned on a toboggan may bend the runners laterally.

The object of this invention is, therefore, to provide means for mounting runners or guide rods on the under surface of a toboggan whereby both runners are adapted to be flexed laterally to guide the toboggan and wherein both runners are adapted to be flexed outwardly to retard or stop the toboggan.

Another object of the invention is to provide steering and braking mechanism for a toboggan in which the mechanism is adapted to be installed on toboggans now in use.

A further object of the invention is to provide a toboggan having steering and braking mechanism installed thereon in which the toboggan is of a simple and economical construction.

With these and other objects and advantages in view, the invention embodies a toboggan having spaced stationary runners mounted on the under surface and positioned at the forward end, with the runners having arcuate ends that extend upwardly around a portion of the arcuate section at the forward end of a toboggan, semi-flexible rods extended from the stationary runners to points spaced rearwardly from the rear end of the toboggan, a pair of complementary blocks slidably mounted on the trailing end of the toboggan and connected to the semi-flexible rods, a spring positioned with one end connected to each of said blocks, and cables trained over pulleys rotatably mounted on the forward end of the toboggan and extended around pulleys on a trailing end thereof and said cables being connected to the blocks and having hand-receiving rings on the opposite ends by which the cables are actuated by a person positioned on the toboggan.

Other features and advantages of the invention will appear from the following description taken in connection with the drawing, wherein:

Figure 1 is a perspective view illustrating the improved toboggan showing the upper surface thereof and showing the cover of an enclosure at the rear broken away to show the sliding block and pulley therein.

Figure 2 is a view looking upwardly toward the under surface of the toboggan.

Figure 3 is a detail showing a plan view of the rear end of a toboggan with the forward part of the toboggan broken away and with the parts shown on an enlarged scale.

Figure 4 is a rear elevational view of the toboggan.

Figure 5 is a cross section through the rear end of the toboggan, being taken on line 5—5 of Figure 2.

Referring now to the drawing wherein like reference characters denote corresponding parts, the improved steering mechanism for a toboggan includes stationary guides or runners 10 and 11, flexible rods 12 and 13 positioned with the forward end of the rod 12 secured to the runner 10 and the forward end of the rod 13 secured to the runner 11, sliding blocks 14 and 15, a spring 16 connecting the blocks 14 and 15 and cables 17 and 18 positioned with the cable 17, which is connected to the block 14, trained over a pulley 19 on the trailing end of the toboggan and also over a vertically disposed pulley 20 at the forward end of the toboggan with the extended end of the cable 17 provided with a ring 21 by which the cable is adapted to be gripped by hand. In the same manner, the cable 18, which is attached to the block 15, is trained over a pulley 22 on the trailing end of the toboggan and around a pulley at the forward end, similar to the pulley 20, with the extended end of the cable provided with a hand gripping ring 23 by which the steering elements on one side of the toboggan are actuated.

As illustrated in Figure 3, the trailing end of the toboggan is provided with a panel 24 having cleats 25 and 26 at the ends and a block 27 in the intermediate part and the blocks 14 and 15 are slidably mounted in a slot positioned between the panel 24 and a cover 28 whereby the blocks are held between the panel and cover and are adapted to slide laterally.

Also as illustrated in Figure 3, the cable 17, which extends around the pulley 19, is attached to the block 14 with a loop 29 on the end of the cable extended through an opening 30 in the block and the cable 18, which etxends around the pulley 22, is fastened to the block 15 in a similar manner with a loop 31 on the end of the cable extended through an opening 32 in the small section of the block.

The block 14 is also provided with an opening 33 into which an upwardly extended end 34 of the guide rod 12 extends and the block 15 is provided with a similar opening 35 in which an L-shaped end 36 of the guide rod 13 is positioned.

The block 14 is also provided with a tang 37 in which one end of the spring 16 is held and the block 15 is provided with a similar tang 38 to which the opposite end of the spring is connected.

The pulley 19 is rotatably mounted by a pin 39 between the panel 24 and cover 28 and the pulley 22 is rotatably mounted by a pin 40 also secured in the panel 24 and cover 28.

The pulleys 20, at the forward end of the toboggan, are rotatably mounted by pins 41 between arms 42 and 43 of the brackets 44 and, as illustrated in Figure 1, the brackets are mounted on a base 45 of the toboggan, the base being preferably formed of a relatively thin sheet of material.

The panel 24 is mounted on the rear end of the base 45 and the forward end of the base is provided with an arcuate section or roll, as indicated by the numeral 46.

The base is also provided with transversely disposed struts, as indicated by the numeral 47 and a reinforcing strip 48 may be provided at the center.

With the parts assembled and installed on a toboggan, as illustrated and described, it will be noted that a pull on the ring 23 pulls the block 15 toward one side of the toboggan with the block bending or flexing the guide rod 13 and with the ring 21 released the spring 16 causes the block 14 to follow the block 15 whereby the guide rod 12 also bends or flexes toward the opposite side of the toboggan thereby guiding the toboggan toward the right-hand side thereof.

In a similar manner, a pull on the ring 21 moves the block 14 and also the block 15 through the spring 16 toward the opposite side or toward the position of the block 14 shown in full lines in Figure 3, whereby the toboggan is steered toward the left.

By pulling on both of the rings 21 and 23, the spring 16 stretches and both of the blocks 14 and 15 are drawn outwardly to the positions illustrated by the full lines in Figure 3 whereby a braking action is provided and the toboggan may be brought to a standstill.

With the parts formed in this manner, the steering mechanism may readily be installed on a toboggan now in use and a person sitting upon the toboggan and holding the rings 23 and 21 may steer and guide the toboggan or may retard the progress thereof.

It will be understood that modifications, within the scope of the appended claims, may be made in the design and arrangement of the parts without departing from the spirit of the invention.

What is claimed is:

1. A toboggan steering assembly comprising spaced longitudinally disposed flexible rods adapted to be mounted on the lower surface of a toboggan with the ends of the rods at the forward end of the toboggan secured to stationary runners mounted on the forward end of the toboggan, blocks slidably mounted on the trailing end of the toboggan and positioned to slide laterally, a panel and cover on the trailing end of the toboggan spaced from each other to provide an elongated slot in which said blocks are slidably mounted, a guide block mounted intermediate of said panel and cover coacting with said blocks to guide their movement, the trailing ends of the rods being connected to said blocks, and means for actuating the blocks from the forward end of the toboggan.

2. A steering assembly for a toboggan comprising longitudinally disposed spaced parallel flexible rods adapted to be positioned against the lower surface of a toboggan, means securing the forward ends of the rods to the forward end of the toboggan, laterally slidable blocks positioned in the trailing end of the toboggan, a panel and cover on the trailing end of the toboggan spaced from each other to provide an elongated slot in which said blocks are slidably mounted, a guide block mounted intermediate of said panel and cover coacting with said blocks to guide their movement, the trailing ends of said flexible rods being attached to said blocks, a spring connecting the blocks, cables trained over pulleys and having rings on the forward ends thereof connected to the blocks and extended to the forward end of the toboggan whereby pulling the cables draws the blocks outwardly toward the sides of the toboggan.

3. A steering assembly for a toboggan comprising longitudinally disposed spaced parallel flexible rods adapted to be positioned against the lower surface of a toboggan, means securing the forward ends of the rods to the forward end of the toboggan, laterally slidable blocks positioned in the trailing end of the toboggan, a panel and cover on the trailing end of the toboggan spaced from each other to provide an elongated slot in which said blocks are slidably mounted, a guide block mounted intermediate of said panel and cover coacting with said blocks to guide their movement, the trailing ends of said flexible rods being attached to said blocks, a spring connecting the blocks, cables trained over pulleys and having rings on the forward ends thereof connected to the blocks and extended to the forward end of the toboggan whereby pulling the cables draws the blocks outwardly toward the sides of the toboggan, said spring causing one block to follow the other.

4. In a toboggan, the combination which comprises spaced parallel stationary guides positioned on the under surface of the forward end of a toboggan, blocks mounted to slide laterally positioned in the trailing end of the toboggan, a panel and cover on the trailing end of the toboggan spaced from each other to provide an elongated slot in which said blocks are slidably mounted, a guide block mounted intermediate of said panel and cover coacting with said blocks to guide their movement, flexible rods connected to the stationary guides and blocks, a spring connecting the blocks and cables with hand receiving rings on the forward ends extended from the blocks to the forward end of the toboggan, said cables being positioned to actuate the blocks laterally.

References Cited in the file of this patent

UNITED STATES PATENTS

| | | |
|---|---|---|
| 2,006,328 | Scholtes | June 25, 1935 |
| 2,027,128 | Tessmer | Jan. 7, 1936 |
| 2,187,437 | Wanat | Jan. 16, 1940 |
| 2,233,012 | Holbrook | Feb. 25, 1941 |
| 2,677,551 | Berg | May 4, 1954 |

FOREIGN PATENTS

| | | |
|---|---|---|
| 27,386 | Great Britain | Dec. 11, 1907 |
| 241,126 | Switzerland | June 17, 1946 |